Dec. 4, 1928.

J. P. COE 1,693,637

APPARATUS FOR MANUFACTURING INNER TUBES

Original Filed Aug. 4, 1926  2 Sheets-Sheet 1

INVENTOR
John P. Coe
BY
ATTORNEY

Dec. 4, 1928.

J. P. COE 1,693,637

APPARATUS FOR MANUFACTURING INNER TUBES

Original Filed Aug. 4, 1926   2 Sheets-Sheet 2

INVENTOR
John P. Coe
BY
Ernest Hopkinson
ATTORNEY

Patented Dec. 4, 1928.

1,693,637

UNITED STATES PATENT OFFICE.

JOHN P. COE, OF DETROIT, MICHIGAN, ASSIGNOR TO G & J TIRE COMPANY, OF INDIANAPOLIS, INDIANA, A CORPORATION OF INDIANA.

APPARATUS FOR MANUFACTURING INNER TUBES.

Original application filed August 4, 1926, Serial No. 126,971. Divided and this application filed April 10, 1928. Serial No. 268,869.

This application is a division of application Serial No. 126,971, filed Aug. 4, 1926.

This invention relates to an apparatus for the manufacture of endless tubular articles and more particularly to an apparatus for transversely splicing inner tubes prior to their vulcanization.

An object of the invention is to provide a simple apparatus for economically splicing the ends of a hollow rubber article, such as an inner tube, in order to make it endless for facilitating the application of pressure to and the welding of the stock in the splicing operation, and for permitting the expeditious removal of the endless tube or article from the apparatus after the splice has been made. These are some of the objects of the invention, other objects of which will appear later in connection with the detailed description.

An embodiment of the invention is illustrated in the accompanying drawings in which.

Figure 2:
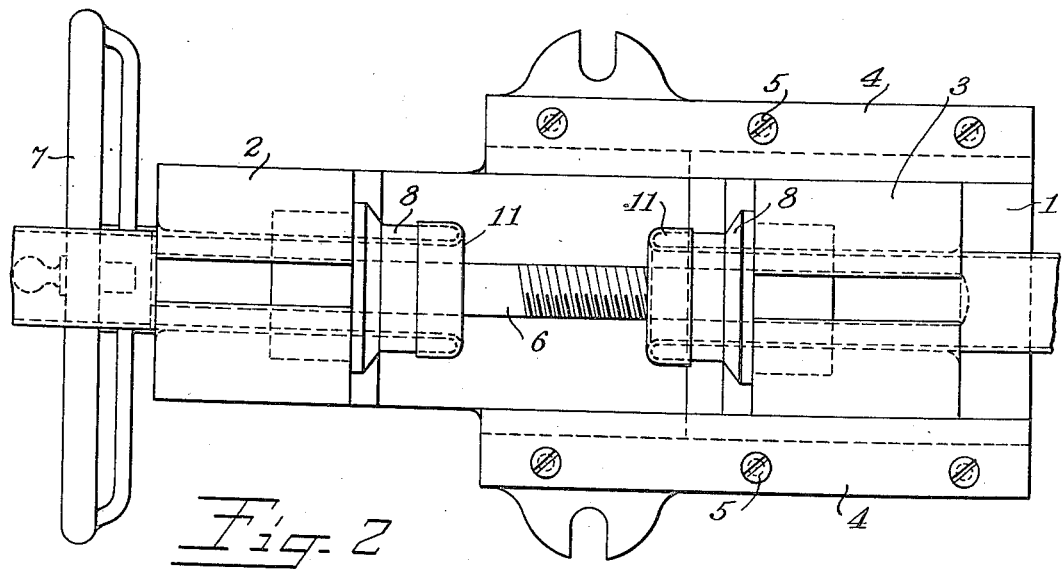
Fig. 2 is a top view of the device.
Figure 1:
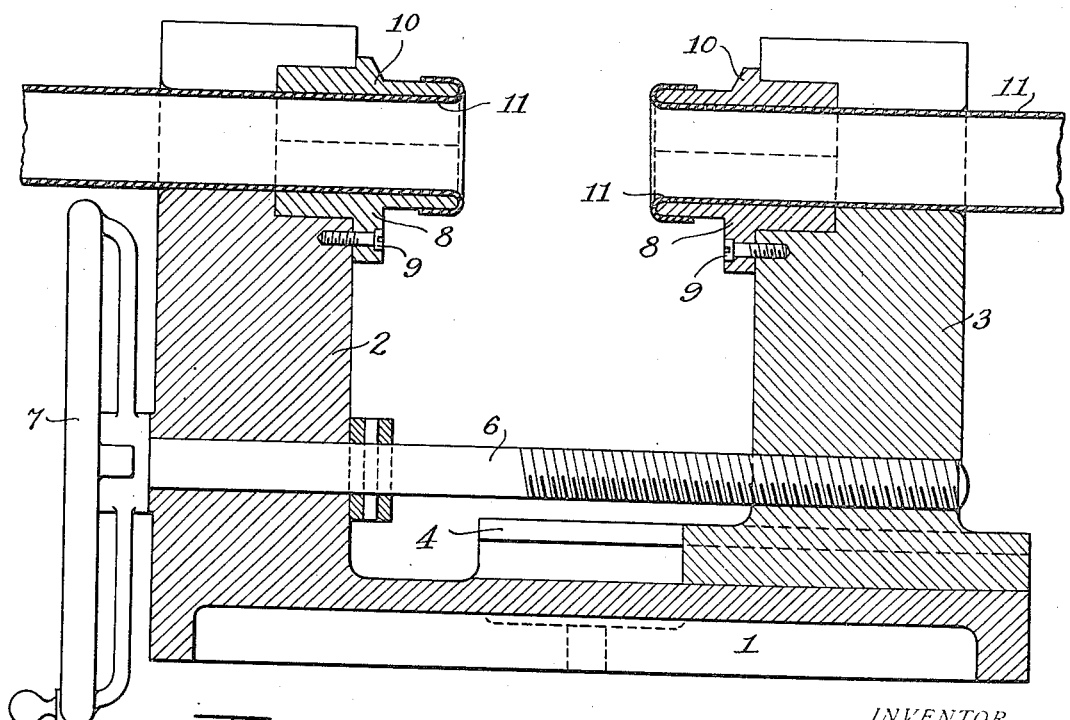
Fig. 1 is a longitudinal section showing the mandrels mounted in opposition in a press or vise which is in open position.

Referring first to Fig. 1, it will be seen that a pair of cutting dies or mandrels are mounted in opposition in a press or vise comprising the base 1, a stationary jaw 2, and a movable jaw 3. The movable jaw 3 is adapted to travel in the slideway which is formed by the plates 4 secured to the base by the bolts or rivets 5. A worm gear 6 is provided on which the movable jaw 3 may be caused to travel to or away from the stationary jaw 2 by operation of the wheel 7. The cutting dies or mandrels 8 are rigidly fixed in opposition in the two jaws of the vise by screws 9. Each mandrel is provided at the top with a removable section 10 permitting the completed tube to be removed from the enclosing form. The tubing 11 to be spliced is placed within the mandrels and the protruding ends turned back over the cutting ends of the dies. The wheel 7 is then operated causing the movable jaw 3 to move forward bringing the two cutting dies into contact, cutting off the turned-back portions or cuffs and squeezing together the two ends of the tubing, thereby uniting it into an endless tube of annular form.

Figure 3:
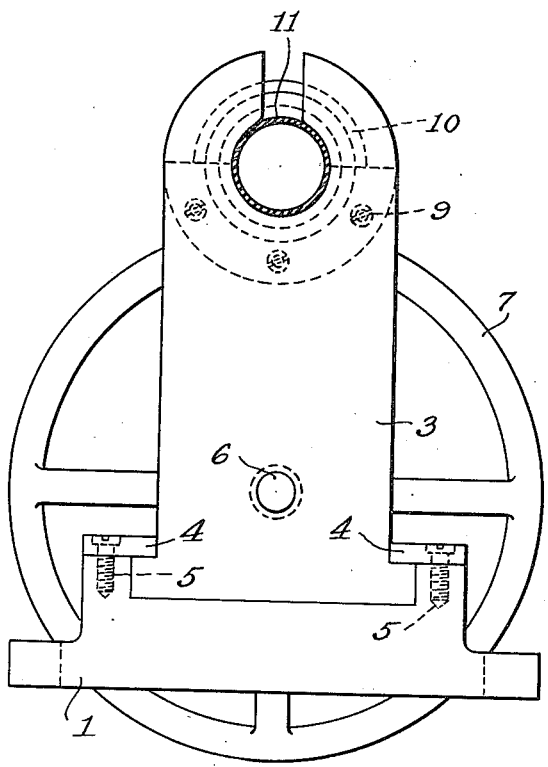
Fig. 3 is an end view showing the gap or opening in the top of the jaws of the vise through which tubing to be spliced may be introduced into the mandrels.
Figure 4:
Fig. 4 is a longitudinal section of the unvulcanized composition tubing in a position immediately before the ends are squeezed together.
Figure 6:
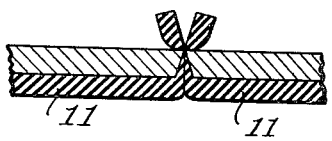
Fig. 6 is a longitudinal section showing a modified form of cutting die or mandrel.
Figure 7:
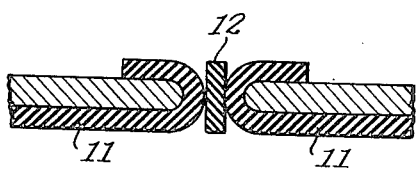
Fig. 7 is a longitudinal section showing a means of thickening the splice by introducing a strip of rubber between the ends of the tubing.

By reference to Fig. 3 it will be seen that a gap or opening is provided in the top of both the vise members 2 and 3 through which the tubing may be initially supplied to the mandrels. In the practice of this method for splicing tubes a pair of mandrels will be provided, perhaps 6" long, of the desired diameter, and with the cutting ends rounded or beveled or otherwise shaped, as desired. It has been found that if the cutting die or mandrel is thicker for the same thickness of rubber, the area subjected to the welding action is greater and a stronger seam results. The same thing can be accomplished by using a die with a flat beveled face, as shown in Fig. 6, or by increasing the thickness of the rubber at the seam by adding a strip, as shown in Fig. 7.

Figure 5:
Fig. 5 is a section similar to that shown in Fig. 4 showing a method of reinforcing the splice.

Fig. 5 is a longitudinal section of the vulcanized composition tubing illustrating how the seam may be reinforced if desired by wrapping strips of rubber around the tube at the point of union.

When the ends to be spliced are pressed together the manner disclosed above the seam will be formed almost instantaneously. It has been found that some seams formed in this manner are definitely stronger than the rest of the tube wall without any further treatment after cutting.

In practice it may or may not be necessary, depending upon factory conditions, to clean the ends of the tubing with naphtha, or other suitable fluid, before splicing. It may also be desirable to first dampen the ends of the cuff with benzol.

An inflating valve stem is built into the body of the unvulcanized tube in any convenient and well-known manner, preferably before uniting the ends. The completed tube is then placed in a mold and filled with a fluid under pressure, such as inert gas, water, or steam, and vulcanized, or it may be vulcanized in a pan of talc or otherwise.

The apparatus of the present invention is simple and inexpensive. Of course any suitable means may be employed to move either or both of the jaws 2 and 3. The movable section 10 of each of the mandrels 8, of course, permits the endless article to be removed with facility through the gap or slot provided in each of the jaws or vises 2 and 3. As illustrated, the sections 10 are completely separable from the lower section of each mandrel, but obviously they may be hinged together or otherwise articulated for movement to open the mandrel and permit lateral removal of the spliced endless tube. The mandrels 8, while preferably as shown made independent of the jaws 2 and 3, need not be so made, integral formation with said jaws being obviously an alternative expedient. Various changes and alterations may be made in the construction without departing from the underlying principles of the invention, and reference should therefore be made to the accompanying claims for an understanding of the scope.

Having thus described my invention, what I claim and desire to protect by Letters Patent is:

1. An apparatus for splicing hollow rubber articles into an endless form comprising means encircling each end of the hollow article and permitting portions of the open end of the article to be turned outwardly, and means for moving the first mentioned means together to join the ends of the hollow article in the form of an annular seam, said first mentioned means having relatively movable parts permitting removal of the endless article after seaming.

2. An apparatus for splicing tubes into an endless form comprising a pair of mandrels having complete endless cutting ends and each mandrel having at least one movable section past which an endless spliced tube may be withdrawn, and means for moving the mandrels oppositely to effect a complete splicing of tube ends mounted thereon.

3. An apparatus for splicing tubes into an endless form comprising a pair of mandrels having cutting ends and each mandrel having at least one shiftable section past which an endless spliced tube may be withdrawn, members for supporting said mandrels in opposed cooperative relation, and means for approaching and separating said members and mandrels, each of said members being provided with an opening adapted also to pass a spliced endless tube.

Signed at New York, county and State of New York, this 30th day of March, 1928.

JOHN P. COE.